United States Patent
Kobayashi et al.

(10) Patent No.: US 9,236,970 B2
(45) Date of Patent: Jan. 12, 2016

(54) SIGNAL PROCESSING DEVICE, SIGNAL PROCESSING METHOD, AND PROGRAM

(71) Applicant: Renesas Electronics Corporation, Kanagawa (JP)

(72) Inventors: Hiroyuki Kobayashi, Kanagawa (JP); Osamu Inagawa, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/606,062

(22) Filed: Jan. 27, 2015

(65) Prior Publication Data

US 2015/0215065 A1   Jul. 30, 2015

(30) Foreign Application Priority Data

Jan. 29, 2014   (JP) ................................. 2014-013926

(51) Int. Cl.
| | |
|---|---|
| *H04L 27/06* | (2006.01) |
| *H04J 11/00* | (2006.01) |
| *H04L 27/26* | (2006.01) |

(Continued)

(52) U.S. Cl.
CPC ............ *H04J 11/0066* (2013.01); *H04B 1/109* (2013.01); *H04L 25/03834* (2013.01); *H04L 25/08* (2013.01); *H04L 27/265* (2013.01); *H04L 27/2647* (2013.01)

(58) Field of Classification Search
CPC ..... H04J 11/0066; H04L 27/265; H04L 25/08
See application file for complete search history.

(56) References Cited

U.S. PATENT DOCUMENTS

| | | | |
|---|---|---|---|
| 2006/0269004 A1* | 11/2006 | Ibrahim et al. | ................. 375/260 |
| 2008/0095253 A1* | 4/2008 | Koga et al. | ..................... 375/260 |

(Continued)

FOREIGN PATENT DOCUMENTS

| | | |
|---|---|---|
| WO | 2009031239 | 3/2009 |
| WO | 2009/086178 A2 | 7/2009 |

OTHER PUBLICATIONS

Extended European Search Report received in corresponding European Application No. 14198517.6 dated Jun. 18, 2015.

(Continued)

*Primary Examiner* — Erin File
(74) *Attorney, Agent, or Firm* — Mattingly & Malur, PC

(57) ABSTRACT

Disclosed is a signal processing device that reduces the influence of an interfering wave to suppress the deterioration of a BER even if narrow-band noise is included in a communication band. In the signal processing device, which is capable of performing an FFT and performing a window function process as preprocessing before the FFT and achieves OFDM demodulation, the window function process is skipped to perform an FFT on a received signal if the frequency of narrow-band noise included in the received signal coincides with the subcarrier frequency of OFDM within a predetermined range. If the frequencies do not coincide with each other, the FFT is performed after the window function process is performed on the received signal. The signal processing device includes an NBN detection/determination section, which determines whether narrow-band noise is included in a subcarrier, and a window function determination section, which determines, in accordance with the degree of coincidence between the frequency of narrow-band noise and the frequency of a subcarrier, whether or not to perform the window function process.

18 Claims, 11 Drawing Sheets

(51) Int. Cl.
*H04L 25/08* (2006.01)
*H04B 1/10* (2006.01)
*H04L 25/03* (2006.01)

(56) References Cited

U.S. PATENT DOCUMENTS

2009/0052562 A1* 2/2009 Akahori .................. 375/260
2010/0183105 A1 7/2010 Takeyama et al.
2014/0016730 A1* 1/2014 Yanagisawa et al. ......... 375/346

OTHER PUBLICATIONS

Valkama, M. et al., "OFDM Transmission with Receiver Windowing for Improved Interference Rejection", IEEE Journal, 2003, p. 679-682.

Redfern, A. J., "Receiver Window Design for Multicarrier Communication Systems", IEEE Journal on Selected Areas in Communications, Jun. 2002, p. 1029-1036. vol. 20, No. 5, TX.

* cited by examiner

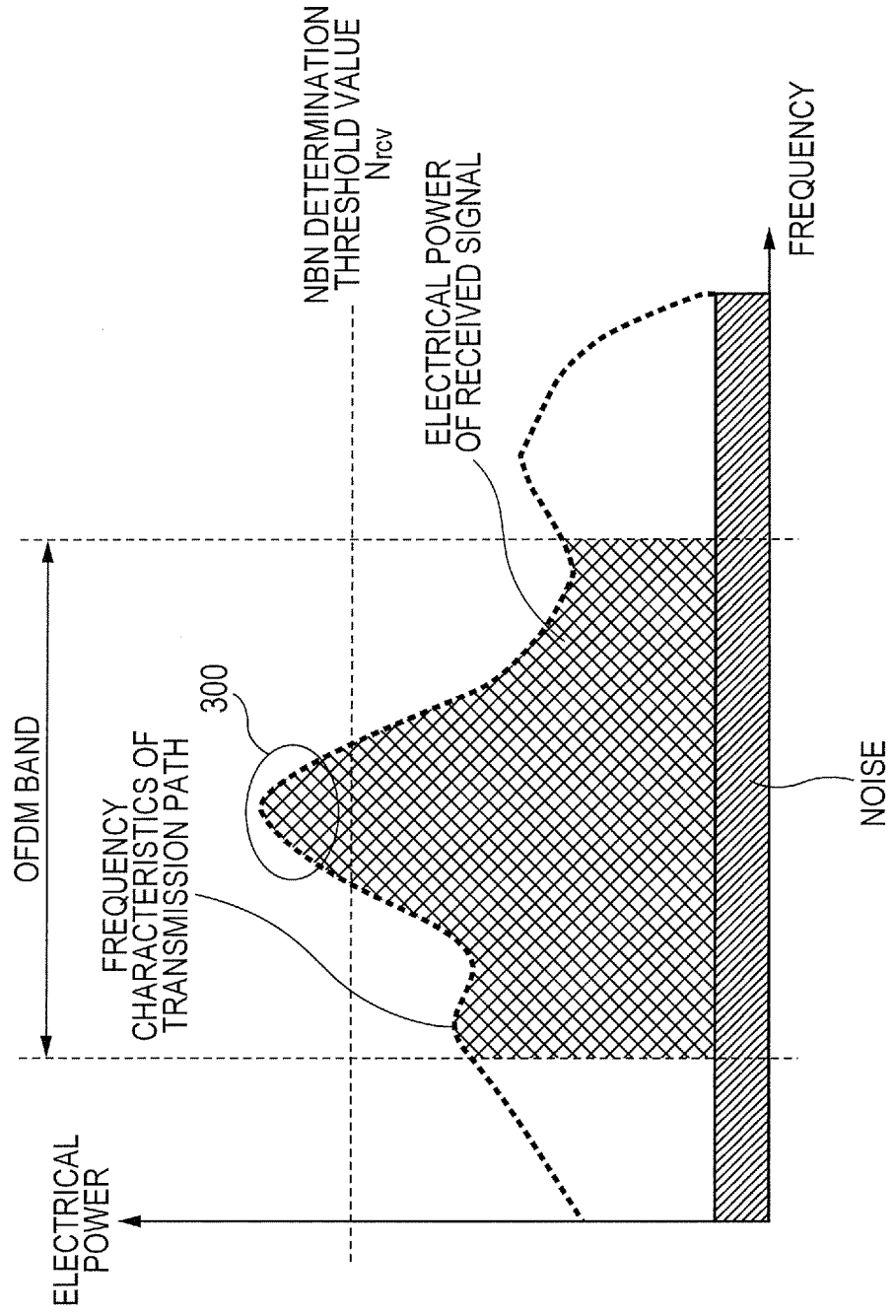

SIGNAL PROCESSING DEVICE, SIGNAL PROCESSING METHOD, AND PROGRAM

CROSS-REFERENCE TO RELATED APPLICATIONS

The disclosure of Japanese Patent Application No. 2014-013926 filed on Jan. 29, 2014 including the specification, drawings and abstract is incorporated herein by reference in its entirety.

BACKGROUND

The present invention relates to a signal processing device, a signal processing method, and a program. In particular, the present invention is preferably applicable to an orthogonal frequency division multiplexing receiver (OFDM receiver).

For an OFDM receiver used, for instance, for communication and broadcasting, a fast Fourier transform (FFT) is generally used. A signal received by the OFDM receiver has a spectrum that exhibits an impulsive peak periodically at intervals of subcarrier frequency. Therefore, demodulation is achieved by using the FFT to calculate the intensity of the signal at a frequency equivalent to the intervals of subcarrier frequency. As is well known, the FFT is a process in which a matrix operation is performed on a finite number of time-series data. More specifically, the FFT is an algorithm that assumes a waveform in which the finite number of time-series data are periodically repeated, and rapidly calculates a frequency component that is obtained when the waveform is Fourier-transformed. In reality, however, the signal actually input to the FFT cannot be expected to be a waveform that is repeated at intervals of the number of time-series data (FFT length), which is an input to the FFT. Nevertheless, the FFT makes the above assumption. It means that a waveform in which discontinuity occurs at joints between the finite number of time-series data is assumed to be an input signal. Thus, a frequency component derived from waveform discontinuities leaks into a normal frequency component. As a result, a so-called leakage error occurs. It is known that preprocessing is performed before the FFT to execute a window function in order to suppress the leakage error. For example, a Blackman-Tukey window function is well known. When a finite number of time-series signals for FFT are obtained from a sequence of time-series signals and subjected to a weighting process, the above-mentioned window function suppresses the leakage error by alleviating the discontinuities at the joints.

A technology disclosed in WO/2009/031239 enables an OFDM receiver having an FFT circuit preceded by a window function processing section to eliminate an interfering wave while performing a window function process to suppress the deterioration of a bit error rate (BER). A desired-to-undesired signal ratio (D/U ratio) measurement section is incorporated in the OFDM receiver to change the coefficients of the window function process in accordance with a measured D/U ratio. As described in FIGS. 8 and 9 and in paragraphs 0055 to 0057, the window function process is performed by selecting one window function coefficient set from two different window function coefficient sets in accordance with the measured D/U ratio. Consequently, the interfering wave can be successfully eliminated.

SUMMARY

Inventors of the present invention investigated WO/2009/031239 and found the following problems.

The inventors found that the degree of error was increased in some cases to deteriorate the BER when a signal received by an OFDM receiver for communication and broadcasting and corrupted by narrow-band noise (NBN) within the communication band of the OFDM receiver was subjected to the above-mentioned window function process, which was performed as preprocessing before an FFT. The inventors also found that, depending on the relationship between an NBN frequency and a subcarrier frequency, the window function process effectively suppressed the interfering wave in one case, but increased the influence of the interfering wave to deteriorate the BER in the other case.

Eventually, it is found that if NBN enters the communication band of OFDM, no well-known technology sufficiently suppresses the deterioration of the BER by decreasing the influence of an interfering wave.

Means for solving the above problems will be described below. Other problems and novel features will become apparent from the following description and from the accompanying drawings.

An aspect of the present invention is described below.

According to an aspect of the present invention, there is provided a signal processing device that is capable of performing an FFT and a window function process as preprocessing before the FFT and achieves OFDM demodulation. The signal processing device includes a unit that detects the degree of coincidence between a subcarrier frequency and the frequency of narrow-band noise (NBN) included in a received signal. In accordance with the detected degree of coincidence, the signal processing device determines whether or not to perform the window function process as preprocessing before the FFT. If the frequency of the NBN included in the received signal coincides with the subcarrier frequency of OFDM within a predetermined range, the signal processing device performs the FFT on the received signal without performing the window function process. If, on the other hand, the above two frequencies do not coincide with each other, the signal processing device performs the window function process on the received signal and then performs the FFT.

An advantage provided by the above aspect of the present invention is outlined below.

Even if NBN enters the communication band of OFDM, the present invention makes it possible to suppress the deterioration of a BER by reducing the influence of an interfering wave.

BRIEF DESCRIPTION OF THE DRAWINGS

Embodiments of the present invention will be described in detail based on the following figures, in which:

FIG. 12 is an explanatory diagram illustrating an OFDM signal received from a transmission path having frequency characteristics.

DETAILED DESCRIPTION

1. Overview of Embodiments

Figure 1:
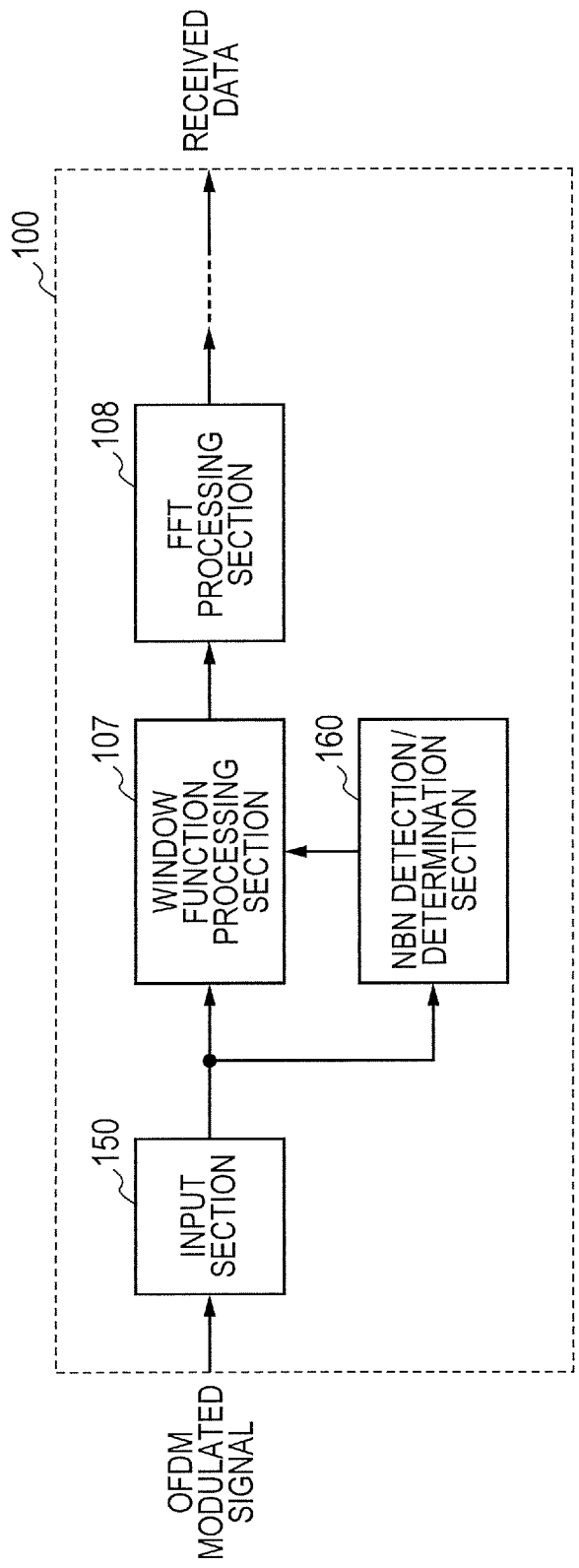
FIG. 1 is a block diagram illustrating an exemplary configuration of an OFDM receiver according to a first embodiment of the present invention.

First of all, representative embodiments of the present invention disclosed in this document will be summarized. The parenthesized reference numerals in the accompanying drawings referred to in the overview of the representative embodiments merely illustrate what is contained in the concept of elements to which the reference numerals are affixed.

[1]<Skipping a Window Function Process in Accordance with the Degree of Coincidence Between a Subcarrier Frequency and an NBN Frequency>

According to a first aspect of the present invention, there is provided a signal processing device (100, 200). Upon receipt of a modulated signal that is orthogonal frequency division modulated by a plurality of subcarriers, the signal processing device outputs received data. The signal processing device is configured as described below.

The signal processing device includes an input section (150), a window function processing section (107), an FFT processing section (108), and a narrow-band noise (NBN) detection/determination section (160). The input section extracts a predetermined number of input data from the modulated signal that is in a time series. The window function processing section is capable of exercising control to determine whether or not to perform a window function process on the predetermined number of input data. The FFT processing section performs an FFT process on data output from the window function processing section.

The narrow-band noise detection/determination section detects the degree of coincidence between the frequency of narrow-band noise included in the modulated signal and the frequencies of the subcarriers, and exercises control to determine in accordance with the detected degree of coincidence whether the window function processing section should perform the window function process on the input data and supply the resulting processed data to the FFT processing section or supply the input data to the FFT processing section without performing the window function process on the input data.

Consequently, even if narrow-band noise (NBN) enters the communication band of OFDM, the deterioration of a BER can be suppressed by reducing the influence of an interfering wave.

[2]<FFT-Based NBN Detection and Window Function Process Determination>

According to a second aspect of the present invention, there is provided the signal processing device as described in the first aspect. The FFT processing section acts as a first FFT processing section.

The narrow-band noise detection/determination section includes a second FFT processing section (104) that performs an FFT process on the input data to calculate electrical power at the frequency of each of the subcarriers. If a predetermined threshold value ($N_{rcv}$) is exceeded by the electrical power at two neighboring subcarrier frequencies, the narrow-band noise detection/determination section allows the window function processing section to perform the window function process. If, on the other hand, the threshold value is exceeded by the electrical power at only one subcarrier frequency, the narrow-band noise detection/determination section inhibits the window function processing section from performing the window function process.

Consequently, it is possible to provide a configuration that enables the narrow-band noise detection/determination section to accurately detect the degree of coincidence between the frequency of NBN included in the modulated signal and the frequencies of the subcarriers.

[3]<NBN Determination Threshold Value>

According to a third aspect of the present invention, there is provided the signal processing device as described in the second aspect. The narrow-band noise detection/determination section calculates an average value ($P_{rcv}$) of electrical power at all subcarrier frequencies within the band of the modulated signal from the electrical power calculated by the second FFT processing section, and prescribes the threshold value in accordance with the average value.

Consequently, the narrow-band noise detection/determination section can easily and properly calculate an NBN determination threshold value ($N_{rcv}$) that is used to determine the degree of coincidence between an NBN frequency and a subcarrier frequency.

[4]<NBN Determination in Consideration of Transmission Path Frequency Characteristics>

According to a fourth aspect of the present invention, there is provided the signal processing device as described in the first aspect. The FFT processing section acts as first FFT processing section (108). The signal processing device further includes a standby FFT processing section (202). The narrow-band noise detection/determination section includes a second FFT processing section (104).

While the modulated signal is being input, the second FFT processing section performs an FFT process on the input data to calculate reception state electrical power at the frequency of each of the subcarriers. While the modulated signal is not being input, the standby FFT processing section performs an FFT process on standby state input data, which corresponds to the input data, to calculate standby state electrical power at the frequency of each of the subcarriers.

In accordance with the reception state electrical power and with the standby state electrical power, the narrow-band noise detection/determination section exercises control to determine whether the window function processing section should perform the window function process on the input data and supply the resulting processed data to the first FFT processing section or supply the input data to the first FFT processing section without performing the window function process on the input data.

Consequently, it is possible to reduce the possibility of erroneously determining, depending on the frequency characteristics of a transmission path, whether NBN is included.

[5]<NBN Determination Criteria for a Transmission Path Having Frequency Characteristics>

According to a fifth aspect of the present invention, there is provided the signal processing device as described in the fourth aspect. If a predetermined standby state threshold value ($N_{wait}$) is exceeded by the standby state electrical power at only one subcarrier frequency and a predetermined reception state threshold value ($N_{rcv}$) is exceeded by the reception state electrical power at the only one subcarrier frequency, the narrow-band noise detection/determination section inhibits the window function processing section from performing the window function process.

Consequently, it is possible to properly determine whether NBN is included when an OFDM signal is received through a transmission path having frequency characteristics.

[6]<OFDM Receiver Implemented by Software>

According to a sixth aspect of the present invention, there is provided the signal processing device as described in the first aspect. The signal processing device includes a processor (170) and a memory (180). The window function processing section, the FFT processing section, and the narrow-band noise detection/determination section function when a program stored in the memory is executed by the processor.

Consequently, OFDM reception is implemented by software. Therefore, OFDM reception can easily be achieved in coordination with another piece of software.

[7]<OFDM Receiver for PLC>

According to a seventh aspect of the present invention, there is provided the signal processing device as described in the first aspect. The first input section includes an analog front-end section (102) and a guard interval elimination section (103). The analog front-end section can be coupled through a plug (101) to a transmission path (AC line) for power-line communication. The guard interval elimination section receives an output from the analog front-end section and performs predetermined preprocessing to extract the predetermined number of input data. The signal processing device further includes a demodulation processing section (109) and a decoding processing section (110). The demodulation processing section performs a demodulation process on data output from the FFT processing section. The decoding processing section performs a decoding process on data output from the demodulation processing section and outputs the received data.

Consequently, an OFDM receiver applicable to power-line communication (PLC) is provided.

[8]<1-Chip LSI>

According to an eighth aspect of the present invention, there is provided the signal processing device as described in the seventh aspect. The signal processing device is formed over a single semiconductor substrate.

Consequently, an OFDM receiver is provided as a 1-chip LSI.

[9]<Multi-Chip Module>

According to a ninth aspect of the present invention, there is provided the signal processing device as described in the seventh aspect. The signal processing device is divided into some parts that are formed over multi-chip semiconductor integrated circuits and incorporated into a single package.

Consequently, an OFDM receiver is provided as a multi-chip module.

[10]<Skipping a Window Function Process in Accordance with the Degree of Coincidence Between a Subcarrier Frequency and an NBN Frequency>

According to a tenth aspect of the present invention, there is provided a signal processing method. Upon receipt of a modulated signal that is orthogonal frequency division modulated by a plurality of subcarriers, the signal processing method outputs received data. The signal processing method is configured as described below.

The signal processing method detects the degree of coincidence between the frequency of narrow-band noise included in the modulated signal and the frequencies of the subcarriers (ST01-ST15; ST31-ST56), and determines (ST16; ST57) in accordance with the detected degree of coincidence whether to perform a window function process on a predetermined number of input data extracted from the modulated signal that is in a time series and then perform an FFT process (ST18, ST19; ST59, ST60) or to perform the FFT process without performing the window function process (ST17, ST19; ST58, ST60).

Consequently, even if NBN enters the communication band of OFDM, the deterioration of a BER can be suppressed by reducing the influence of an interfering wave.

[11]<FFT-Based NBN Detection and Window Function Process Determination>

According to an eleventh aspect of the present invention, there is provided the signal processing method as described in the tenth aspect. The FFT process is performed as a first FFT process (ST19; ST60).

The signal processing method performs a second FFT process (ST01; ST42) in which an FFT process is performed on the input data to calculate electrical power (NBN_pwr[i]) at the frequency of each of the subcarriers. If a predetermined threshold value ($N_{rcv}$) is exceeded by the electrical power at two neighboring (consecutive) subcarrier frequencies (STS12; ST53), the first FFT process is performed after the window function process (ST18, ST19; ST59, ST60). If the threshold value is exceeded by the electrical power at only one subcarrier frequency, the first FFT process is performed without performing the window function process (ST17, ST19; ST58, ST60).

Consequently, it is possible to provide a configuration that enables the narrow-band noise detection/determination section to accurately detect the degree of coincidence between the frequency of narrow-band noise included in the modulated signal and the frequencies of the subcarriers.

[12]<NBN Determination Threshold Value>

According to a twelfth aspect of the present invention, there is provided the signal processing method as described in the eleventh aspect. The signal processing method calculates an average value ($P_{rcv}$) of electrical power at all subcarrier frequencies within the band of the modulated signal from the electrical power calculated in the second FFT process, and prescribes the threshold value ($N_{rcv}$) in accordance with the average value (ST02 to ST05).

Consequently, the narrow-band noise detection/determination section can easily and properly calculate an NBN determination threshold value ($N_{rcv}$) that is used to determine the degree of coincidence between an NBN frequency and a subcarrier frequency.

[13]<NBN Determination in Consideration of Transmission Path Frequency Characteristics>

According to a thirteenth aspect of the present invention, there is provided the signal processing method as described in the tenth aspect. The FFT process is performed as a first FFT process (ST60).

While the modulated signal is being input, the signal processing method performs a second FFT process (ST42) on the input data to calculate reception state electrical power (NBN_pwr[i]) at the frequency of each of the subcarriers.

While the modulated signal is not being input, the signal processing method performs a third FFT process (ST31) on standby state input data, which corresponds to the input data, to calculate standby state electrical power (NBN_wait[i]) at the frequency of each of the subcarriers.

In accordance with the reception state electrical power and with the standby state electrical power, the signal processing method determines whether to perform the window function process on the input data and then perform the first FFT process or to perform the first FFT process without performing the window function process (ST47 to ST57).

Consequently, it is possible to reduce the possibility of erroneously determining, depending on the frequency characteristics of a transmission path, whether NBN is included.

[14]<NBN Determination Criteria for a Transmission Path Having Frequency Characteristics>

According to a fourteenth aspect of the present invention, there is provided the signal processing method as described in the thirteenth aspect. If a predetermined standby state threshold value ($N_{wait}$) is exceeded by the standby state electrical power at only one subcarrier frequency and a predetermined reception state threshold value ($N_{rcv}$) is exceeded by the reception state electrical power at the only one subcarrier frequency, the signal processing method performs the first FFT process on the input data without performing the window function process (ST47 to ST60).

Consequently, it is possible to properly determine whether NBN is included when an OFDM signal is received through a transmission path having frequency characteristics.

[15]<Skipping a Window Function Process in Accordance with the Degree of Coincidence Between a Subcarrier Frequency and an NBN Frequency>

According to a fifteenth aspect of the present invention, there is provided a storage medium readable by a computer, the storage medium storing a program that, when executed by a signal processing device having a processor, a memory, and an input section, performs a function for generating received data from a modulated signal that is input from the input section and orthogonal frequency division modulated by a plurality of subcarriers. The function includes steps described below.

A step (ST16 to ST18; ST57 to ST59) of performing a window function process, which is capable of performing the window function process on a predetermined number of input data extracted from the modulated signal that is in a time series.

A step (ST01 to ST10; ST42 to ST51) of detecting narrow-band noise, which detects the degree of coincidence between the frequency of narrow-band noise included in the modulated signal and the frequencies of the subcarriers.

A step (ST11 to ST15; ST52 to ST56) of making a window function determination, which determines, in accordance with the degree of coincidence detected in the step of detecting/determining narrow-band noise, whether to perform a window function process in the step of performing a window function process or to skip the window function process, and a step (ST19; ST60) of performing an FFT process, which performs an FFT process on an output from the step of performing a window function process.

Consequently, even if NBN enters the communication band of OFDM, the deterioration of a BER can be suppressed by reducing the influence of an interfering wave.

[16]<FFT-Based NBN Detection and Window Function Process Determination>

According to a sixteenth aspect of the present invention, there is provided the storage medium as described in the fifteenth aspect. The step of performing an FFT process is performed as a step of performing a first FFT process (ST19; ST60).

The step of detecting/determining narrow-band noise includes a step (ST01; ST42) of performing a second FFT process, in which an FFT process is performed on the input data to calculate electrical power (NBN_pwr[i]) at the frequency of each of the subcarriers. If a predetermined threshold value ($N_{rcv}$) is exceeded by the electrical power at two neighboring subcarrier frequencies, the window function process is performed in the step of performing a window function process (ST18, ST19; ST59, ST60). If the threshold value is exceeded by the electrical power at only one subcarrier frequency, the step of performing a window function process skips the window function process (ST17; ST58).

Consequently, it is possible to provide a configuration that enables the narrow-band noise detection/determination section to accurately detect the degree of coincidence between the frequency of narrow-band noise included in the modulated signal and the frequencies of the subcarriers.

[17]<NBN Determination Threshold Value>

According to a seventeenth aspect of the present invention, there is provided the storage medium as described in the sixteenth aspect. The step of detecting/determining narrow-band noise calculates an average value ($P_{rcv}$) of electrical power at all subcarrier frequencies within the band of the modulated signal from the electrical power calculated in the step of performing a second FFT process, and prescribes the threshold value ($N_{rcv}$) in accordance with the average value (ST02 to ST05).

Consequently, the narrow-band noise detection/determination section can easily and properly calculate an NBN determination threshold value ($N_{rcv}$) that is used to determine the degree of coincidence between an NBN frequency and a subcarrier frequency.

[18]<NBN Determination in Consideration of Transmission Path Frequency Characteristics>

According to an eighteenth aspect of the present invention, there is provided the storage medium as described in the fifteenth aspect. The step of performing an FFT process is performed as a step of performing a first FFT process (ST60). The function further includes a step of performing a standby FFT process (ST31).

The step of detecting/determining narrow-band noise includes a step of performing a second FFT process (ST42).

While the modulated signal is being input, the step of performing a second FFT process (ST42) performs an FFT process on the input data to calculate reception state electrical power (NBN_pwr[i]) at the frequency of each of the subcarriers.

While the modulated signal is not being input, the step of performing a standby FFT process (ST31) performs an FFT process on standby state input data, which corresponds to the input data, to calculate standby state electrical power (NBN_wait[i]) at the frequency of each of the subcarriers.

In accordance with the reception state electrical power and with the standby state electrical power, the step of detecting/determining narrow-band noise exercises control (ST47 to ST57) to determine whether to perform the window function process on the input data in the step of performing a window function process and then forward the resulting processed data to the step of performing a first FFT process or to skip the window function process and then forward the input data to the step of performing a first FFT process.

Consequently, it is possible to reduce the possibility of erroneously determining, depending on the frequency characteristics of a transmission path, whether NBN is included.

[19]<NBN Determination Criteria for a Transmission Path Having Frequency Characteristics>

According to a nineteenth aspect of the present invention, there is provided the storage medium as described in the eighteenth aspect. If a predetermined standby state threshold value ($N_{wait}$) is exceeded by the standby state electrical power at only one subcarrier frequency and a predetermined reception state threshold value ($N_{rcv}$) is exceeded by the reception state electrical power at the only one subcarrier frequency, the step of detecting/determining narrow-band noise causes the step of performing a window function process to skip the window function process (ST47 to ST60).

Consequently, it is possible to properly determine whether NBN is included when an OFDM signal is received through a transmission path having frequency characteristics.

2. Details of Embodiments

Embodiments of the present invention will now be described in further detail.

First Embodiment

FIG. 1 is a block diagram illustrating an exemplary configuration of an OFDM receiver according to a first embodiment of the present invention.

The OFDM receiver 100 is a signal processing device that receives a modulated signal, which is orthogonal frequency division modulated (OFDM) by a plurality of subcarriers, and outputs received data. The OFDM receiver 100 includes an input section 150, a window function processing section 107, an FFT processing section 108, and a narrow-band noise (NBN) detection/determination section 160.

The input section 150 extracts a predetermined number of input data from the received OFDM modulated signal that is in a time series, and supplies the extracted data to the window function processing section 107 and to the NBN detection/determination section 160. The predetermined number of input data is the number of data (FFT length signal) that is input to one FFT process in the FFT processing section 108. The FFT processing section 108 converts an input modulated signal from a time-axis signal to a frequency-axis signal. The frequency-axis signal output from the FFT processing section 108 includes an electrical power value at each subcarrier frequency of input OFDM. The window function processing section 107 is capable of exercising control to determine whether or not to perform a window function process on the input data. The window function process is a weighting process to be performed on each input data and is not particularly limited. For example, a Blackman-Tukey window function is used in the window function process. The FFT processing section 108 performs an FFT process on data output from the window function processing section 107.

The NBN detection/determination section 160 detects the degree of coincidence between the frequency of narrow-band noise included in the modulated signal and the frequencies of the subcarriers, and exercises control to determine in accordance with the detected degree of coincidence whether the window function processing section 107 should perform the window function process on the input data and supply the resulting processed data to the FFT processing section 108 or supply the input data to the FFT processing section 108 without performing the window function process on the input data. The OFDM receiver 100 performs a demodulation process and a decoding process on an output from the FFT processing section 108 to determine and output the received data.

Figure 2:
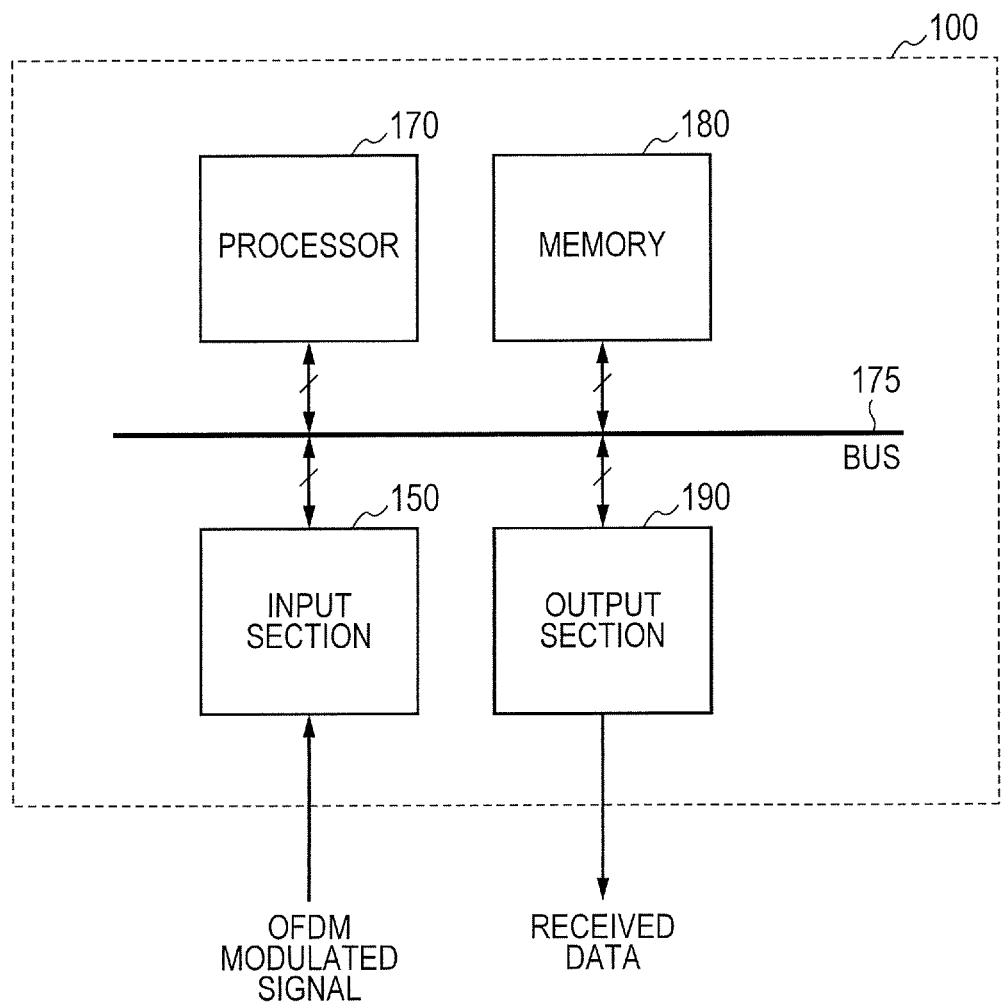
FIG. 2 is a block diagram illustrating a signal processing device that functions as an OFDM receiver when a program according to the first embodiment is executed.

FIG. 2 is a block diagram illustrating a signal processing device that functions as an OFDM receiver when a program according to the first embodiment is executed. The signal processing device 100 is formed by intercoupling a processor 170, a memory 180, an input section 150, and an output section 190 through a bus 175. The input section 150 receives an OFDM modulated signal that is in a time series and sequentially writes the received OFDM modulated signal into the memory 180. When the processor 170 executes a program stored in the memory 180, the signal processing device 100 functions as an OFDM receiver according to the first embodiment. The program to be executed includes steps described below.

Window function processing step: In accordance with the result of determination made in a later-described window function determination step, a window function process is performed on the input data that is extracted from the time-series modulated signal and stored in the memory by the input section 150, or the input data is output without being subjected to the window function process.

FFT processing step: An FFT process is performed on an output generated in the window function processing step.

Narrow-band noise detection step: The degree of coincidence between the frequency of narrow-band noise included in the modulated signal and the frequencies of a plurality of subcarriers is detected.

Window function determination step: In accordance with the degree of coincidence detected in the narrow-band noise detection step, whether to perform a window function process in the window function processing step or to skip the window function process is determined.

The configuration of the signal processing device that executes the above-described program is not limited to the one shown in FIG. 2. The signal processing device may have an arbitrary configuration. For example, the processor 170 may include one or more microprocessor units (MPUs) or digital signal processors (DSPs) having a general-purpose central processing unit (CPU). The memory 180 may include, for example, a plurality of random-access memories (RAMS) or read-only memories (ROMs) formed of flush memories or other nonvolatile memories. The bus 175 may have a hierarchical structure in which, for example, a CPU bus is coupled to a peripheral bus through a bus bridge.

The OFDM receiver 100, which is described with reference to FIG. 1, may be obtained by implementing the above-described functions by using hardware such as an analog circuit and a digital circuit or by allowing the signal processing device 100 having the processor shown in FIG. 2 to execute the above-described program.

Operational advantages provided by the first embodiment will now be described.

Figure 3:
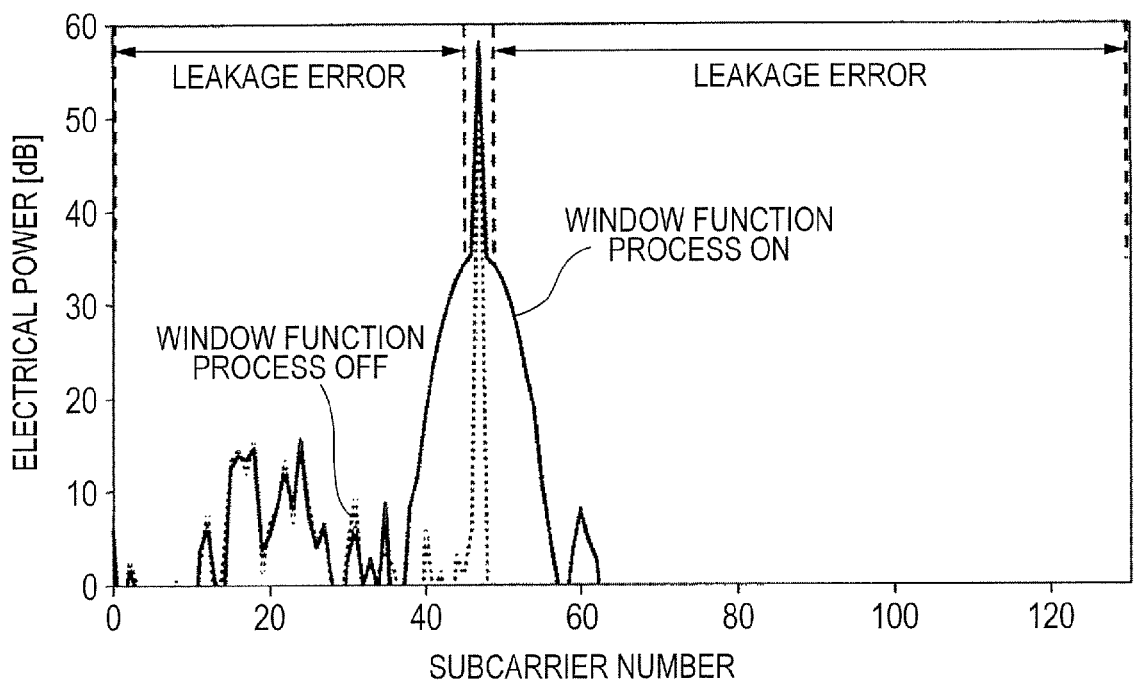
FIG. 3 is an explanatory diagram illustrating an NBN leakage error that occurs when the frequency of NBN coincides with the frequency of a subcarrier.

FIG. 3 is an explanatory diagram illustrating an NBN leakage error that occurs when the frequency of NBN coincides with the frequency of a subcarrier. The horizontal axis, which is a frequency axis, indicates a subcarrier number. The vertical axis indicates an electrical power value that is output from an FFT process performed at each frequency. Indicated is the result of an FFT process performed when the frequency of existing NBN coincides with the frequency of subcarrier No. 48. An electrical power value output when the FFT process is performed subsequently to the window function process (the window function process is ON) is indicated by a solid line. An electrical power value output when the FFT process is performed without performing the window function process (the window function process is OFF) is indicated by a broken line. When the FFT process is performed with the window function process turned OFF (broken line), a peak appears only at the frequency of subcarrier No. 48. NBN exists only at such a frequency and does not cause a leakage error. Meanwhile, an electrical power value output when the FFT process is performed subsequently to the window function process (the window function process is ON) is indicated by a solid line. It is obvious that the NBN existing at the frequency of subcarrier No. 48 leaks to the frequencies of nearby subcarrier numbers to cause an error. Therefore, if the frequency of NBN coincides with the frequency of a subcarrier, the FFT process should be performed without performing the window function process (with the window function process turned OFF) because the leakage error is suppressed to inhibit the NBN from decreasing a BER. In this instance, a normal signal existing at the frequency of subcarrier No. 48 is not properly received due to the influence of the NBN. However, such an improperly received normal signal is corrected and recovered when, for instance, an error correction function is performed in a subsequent demodulation process and decoding process.

Figure 4:
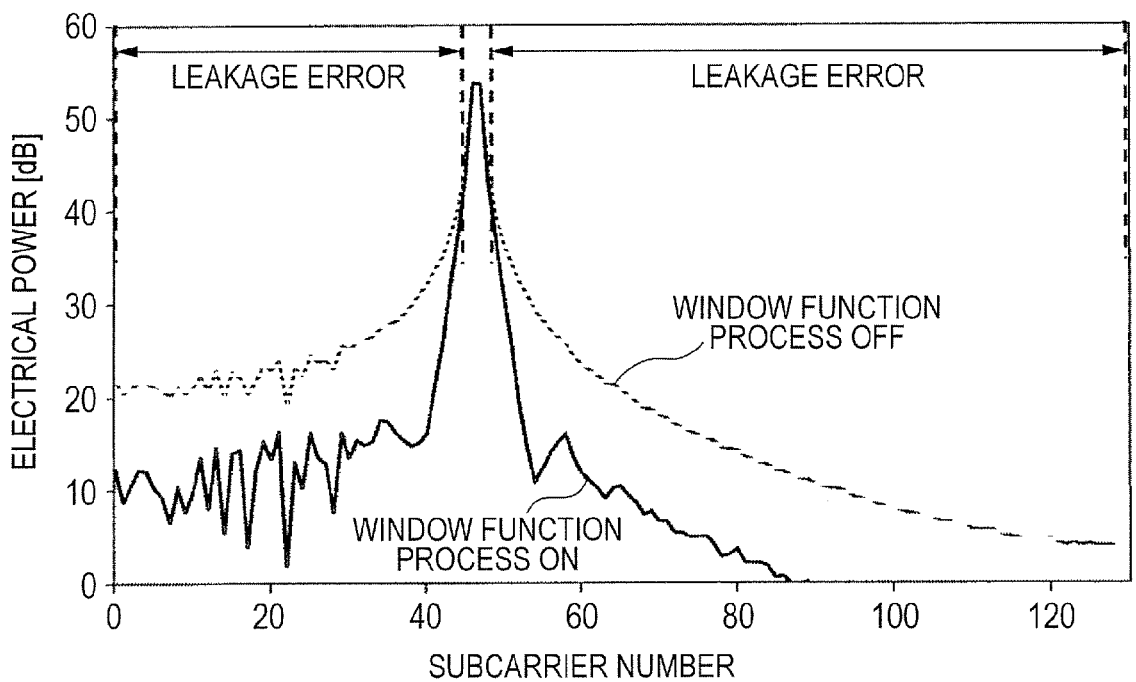
FIG. 4 is an explanatory diagram illustrating an NBN leakage error that occurs when the frequency of NBN does not coincide with the frequency of a subcarrier.

FIG. 4 is an explanatory diagram illustrating an NBN leakage error that occurs when the frequency of NBN does not coincide with the frequency of a subcarrier. As is the case with FIG. 3, the horizontal axis, which is a frequency axis, indicates a subcarrier number, and the vertical axis indicates an electrical power value that is output from an FFT process performed at each frequency. Indicated is the result of an FFT process performed when NBN exists at a frequency intermediate between subcarriers No. 46 and No. 47. An electrical power value output when the FFT process is performed subsequently to the window function process (the window function process is ON) is indicated by a solid line. An electrical power value output when the FFT process is performed without performing the window function process (the window function process is OFF) is indicated by a broken line. The amount of leakage error is smaller when the window function process is turned ON (solid line) than when the window function process is turned OFF (broken line). An advantage normally expected from the window function process is obtained.

If the frequency of NBN coincides with the frequency of a subcarrier, the influence of NBN can be limited to that subcarrier as far as the window function process is not performed. Further, if the frequency of NBN does not coincide with the frequency of a subcarrier, the number of subcarriers affected by the NBN can be decreased as far as the window function process is performed. It means that, even if NBN enters the band of OFDM, the deterioration of a BER can be suppressed by reducing the influence of the NBN.

Second Embodiment

Figure 5:
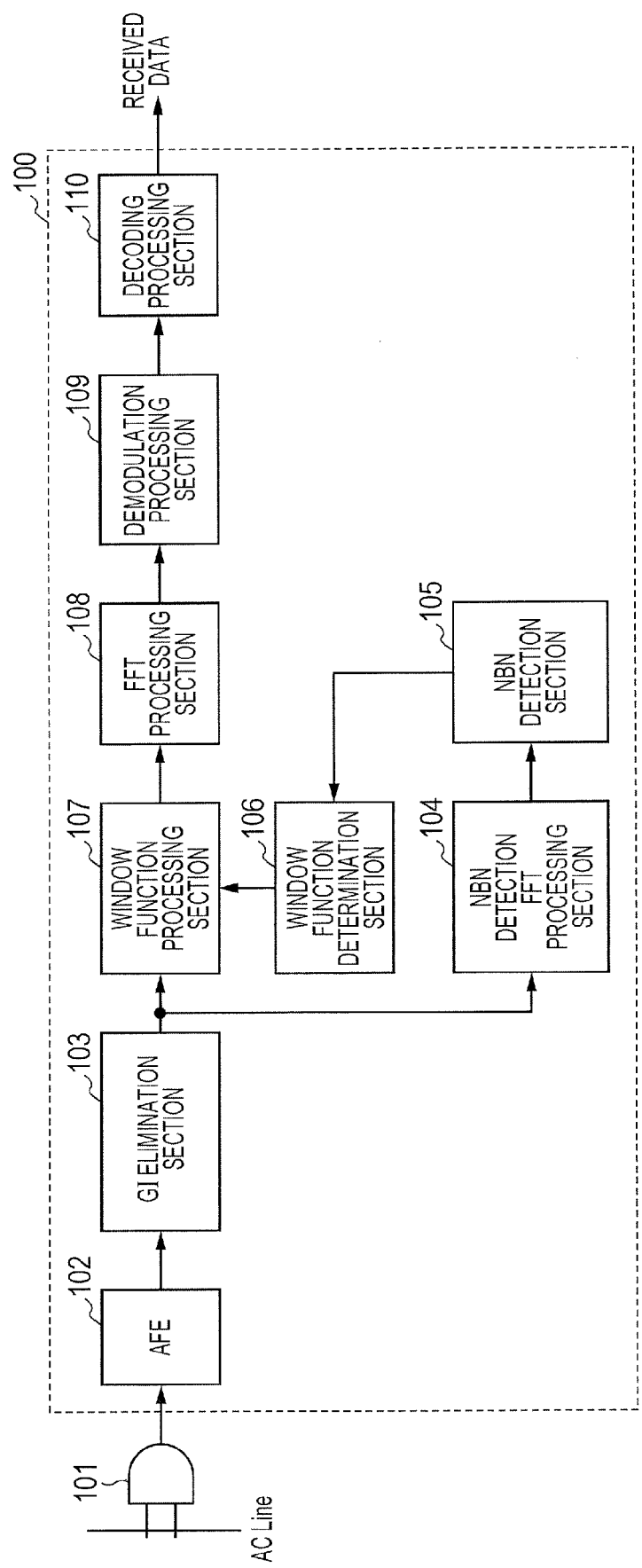
FIG. 5 is a block diagram illustrating an exemplary configuration of the OFDM receiver according to a second embodiment of the present invention.

FIG. 5 is a block diagram illustrating an exemplary configuration of the OFDM receiver according to a second embodiment of the present invention. The OFDM receiver applied to power-line communication (PLC) is shown in FIG. 5 as an embodiment. PLC is communication that is established by superimposing, for example, an OFDM signal (a signal modulated by the OFDM method) on a commercially-available alternating current line (AC line). The OFDM receiver 100 receives the OFDM signal transmitted through the AC line and performs a decoding process on the received OFDM signal.

The OFDM receiver 100 includes an analog front-end (AFE) 102, a guard interval (GI) elimination section 103, an NBN detection FFT processing section 104, an NBN detection section 105, a window function determination section 106, a window function processing section 107, an FFT processing section 108, a demodulation processing section 109, and a decoding processing section 110. The OFDM receiver 100 is coupled to an AC line through a plug 101.

The OFDM signal received from the AC line through the plug 101 is input to the AFE 102 in the OFDM receiver 100. The OFDM signal is subjected to gain adjustment, band-pass filtering, and analog-to-digital conversion in the AFE 102, and then input to the GI elimination section 103. The GI elimination section 103 eliminates a guard interval to form an FFT length signal whose signal length corresponds to the unit of FFT processing. The FFT length signal is input to the NBN detection FFT processing section 104 and to the window function processing section 107.

The NBN detection FFT processing section 104 converts the received signal from a time-axis signal to a frequency-axis signal by performing an FFT process on the FFT length signal. The received signal subjected to the FFT process is then input to the NBN detection section 105.

The NBN detection section 105 performs a threshold-value-based determination process on all subcarriers by using electrical power. If a threshold value is exceeded by a subcarrier, the NBN detection section 105 determines that NBN is included in the subcarrier, and then stores the relevant information in an NBN determination table. The NBN determination table is input to the window function determination section 106.

The window function determination section 106 checks the NBN determination table. If NBN exists in two consecutive subcarriers, the window function determination section 106 determines that the window function process is ON. If NBN exists in only one subcarrier, the window function determination section 106 determines that the window function process is OFF. If NBN exists in three or more consecutive subcarriers, the window function determination section 106 determines that the window function process is ON. If NBN exists in a plurality of subcarriers that are not adjacent to each other or if NBN does not exist in any subcarrier, the window function determination section 106 determines that the window function process is OFF.

In accordance with the result of window function process ON/OFF determination of the window function determination section 106, the window function processing section 107 performs a window function process on the FFT length signal or skips it, and then inputs the FFT length signal to the FFT processing section 108.

The FFT processing section 108 converts the received signal from a time-axis signal to a frequency-axis signal by performing an FFT process on the signal from the window function processing section 107. The received signal subjected to the FFT process is then sent to the demodulation processing section 109, which performs a demodulation process on the OFDM signal, and then forwarded to the decoding processing section 110, which performs, for example, an error correction process to acquire the received data.

The OFDM receiver 100 is not specifically limited, but is configured as a system LSI (large-scale integrated circuit) that is formed by mounting a processor, a memory, and an analog circuit on the same semiconductor substrate, and is manufactured by a well-known CMOS (complementary metal oxide semiconductor) manufacturing process. The analog circuit is configured to provide analog portions of the gain adjustment, filtering process, and analog-to-digital conversion process of the AFE 102. The subsequent processes are performed by the processor, which performs software processes. A program for the software processes is supplied after it is stored in a flush memory or other nonvolatile memory formed on the same chip. Alternatively, the program for the software processes may be supplied after it is stored in a nonvolatile memory formed on a different chip, transferred to an on-chip RAM or other volatile memory by a power-on boot process, and then executed. In this instance, the nonvolatile memory supplied on a different chip may be formed on the same package substrate as for the OFDM receiver 100, placed alongside or over the OFDM receiver 100, and implemented as a multi-chip module into which the nonvolatile memory and the OFDM receiver 100 are both packaged. Here, the processor may be formed of one or more MPUs or DSPs having a general-purpose CPU. The OFDM receiver 100 may include a dedicated signal processing circuit that performs some or all of the software processes performed by the processor in place of or in addition to the software processes. The dedicated signal processing circuit is, for example, a hard-wired logic circuit dedicated to FFT or an accelerator capable of performing an FFT rapidly and efficiently.

Although the receiver for power-line communication has been described here, the second embodiment may be applied to an OFDM receiver for communication and digital broadcasting.

<Operating Steps>

Operating steps performed by the OFDM receiver 100 will now be described.

Figure 6:
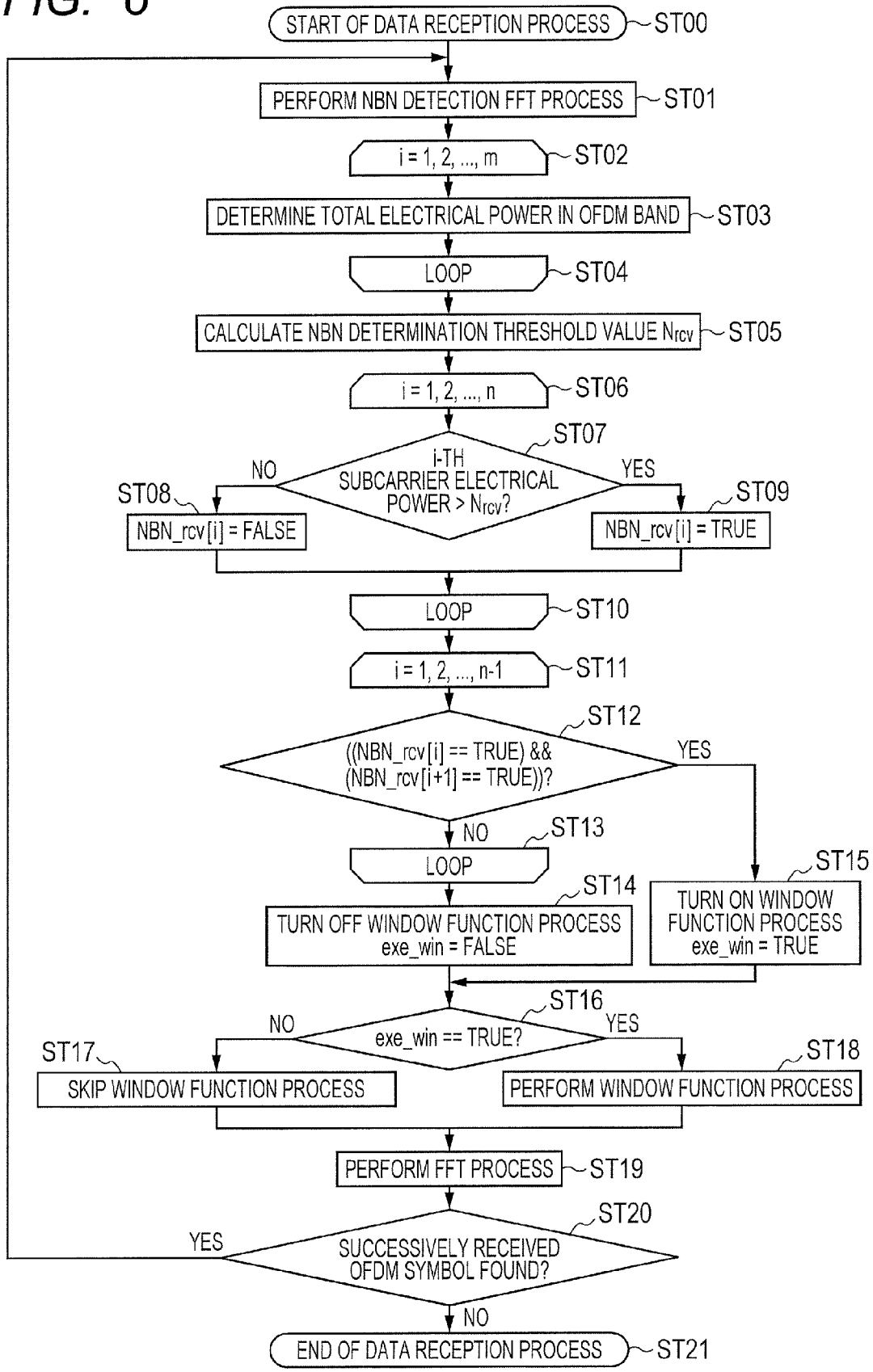
FIG. 6 is a flowchart illustrating an exemplary operation performed by the OFDM receiver according to the second embodiment.

FIG. 6 is a flowchart illustrating an exemplary operation performed by the OFDM receiver according to the second embodiment.

In step ST00, the OFDM receiver 100 starts a data reception process. In step ST01, the NBN detection FFT processing section 104 performs an FFT process to convert a received signal to a frequency-axis signal. Processing then proceeds to step ST02.

In steps ST02 to ST04, the NBN detection section 105 determines the total electrical power of subcarriers in an OFDM band. The integer m in step ST02 coincides with the number of subcarriers in the OFDM band. In G3-PLC, which is a PLC standard, m=36. In PRIME (PoweRline Intelligent Metering Evolution), which is another standard, m=97. In the next step, which is step ST05, in accordance with the total electrical power of subcarriers in the OFDM band, the NBN detection section 105 determines an NBN determination threshold value $N_{rcv}$, which is used to determine whether NBN is included in a subcarrier.

Figure 7:
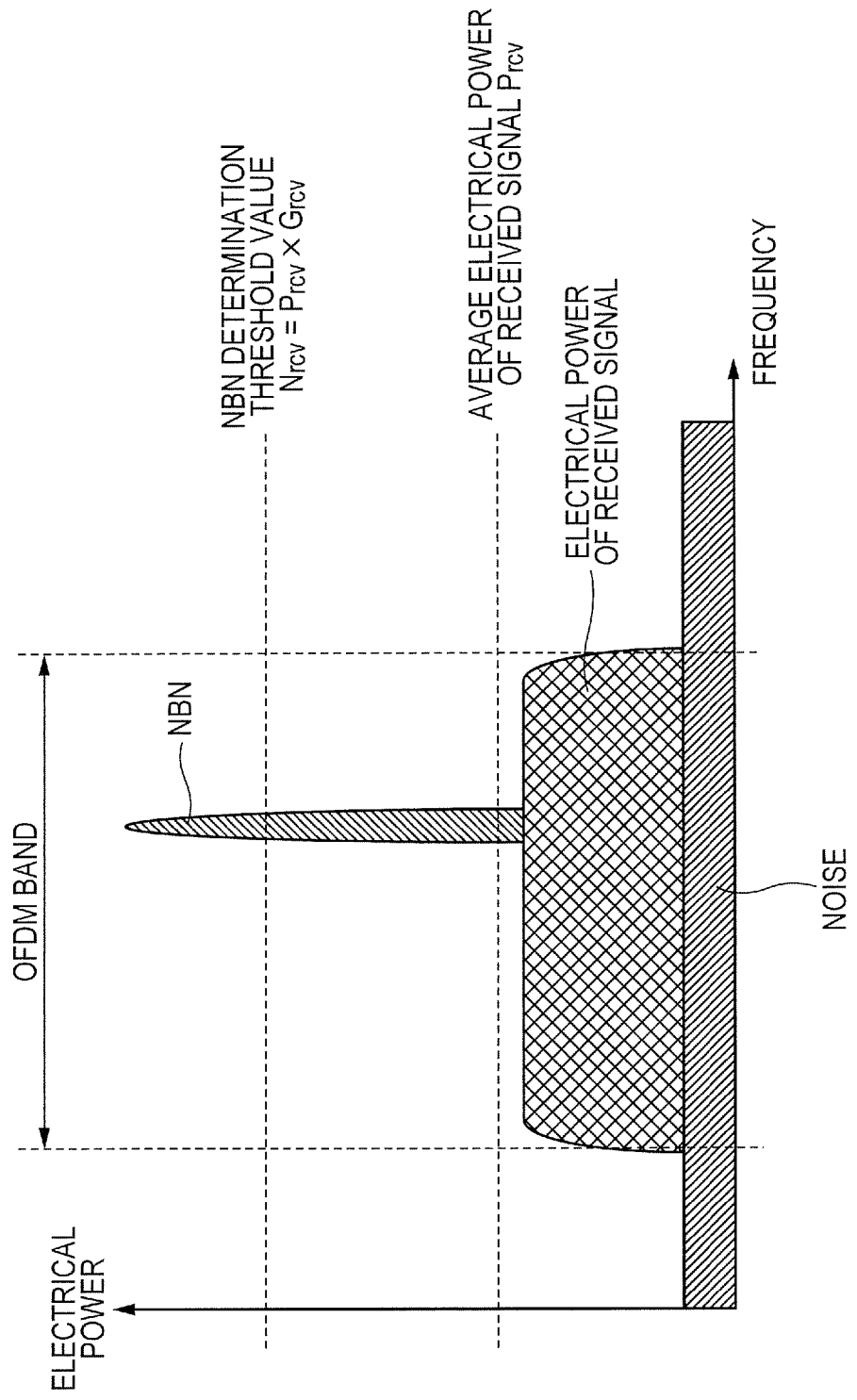
FIG. 7 is an explanatory diagram outlining an NBN determination method.

FIG. 7 is an explanatory diagram outlining an NBN determination method. The horizontal axis indicates frequency, and the vertical axis indicates electrical power. FIG. 7 shows a situation where there is overall background noise (marked "NOISE"), which looks like, for example, white noise, a plurality of subcarriers exist in the OFDM band, and NBN is further included in the OFDM band. The subcarriers in the OFDM band are a set of impulse spectra having substantially the same electrical power. As shown in FIG. 7, the average electrical power $P_{rcv}$ of the received signal in the OFDM band is slightly higher than the electrical power levels of the subcarriers in the OFDM band by an amount equivalent to NBN. The NBN determination threshold value $N_{rcv}$ is determined by the following equation.

NBN determination threshold value $N_{rcv} = P_{rcv} \times G_{rcv}$ where $P_{rcv}$ is P the average electrical power of the subcarriers in the OFDM band and determined by dividing the total electrical power of all subcarriers in the OFDM band by the number of subcarriers m. $G_{rcv}$ is a gain for determining the NBN determination threshold value $N_{rcv}$. The gain $G_{rcv}$ is a parameter that determines how much higher the electrical power value of NBN to be detected is than the electrical power levels of the subcarriers in the OFDM band. The higher the gain $G_{rcv}$, the lower the possibility of erroneous NBN detection. The lower the gain $G_{rcv}$, the higher the sensitivity of NBN detection.

Returning to the flowchart of FIG. 6, in a loop between step ST06 and step ST10, the NBN detection section 105 determines whether NBN exists with respect to each subcarrier in the OFDM band. The integer n in step ST06 coincides with the number of subcarriers. For example, in G3-PLC, n=128, and in PRIME, n=256. In step ST07, the NBN determination threshold value $N_{rcv}$ determined in step ST05 is used to perform a threshold-value-based determination process on the electrical power of the i-th subcarrier in order to determine whether NBN is included in the i-th subcarrier. If the electrical power of the i-th subcarrier is not higher than the NBN determination threshold value $N_{rcv}$, it is determined that no NBN is included in the i-th subcarrier, and then processing proceeds to step ST08. In step ST08, FALSE is set in the NBN determination table NBN_rcv[i]. If, on the contrary, the electrical power of the i-th subcarrier is higher than the NBN determination threshold value $N_{rcv}$, it is determined that NBN is included in the i-th subcarrier, and then processing proceeds to step ST09. In step ST09, TRUE is set in the NBN determination table NBN_rcv[i]. After the above process is repeated for n subcarriers, processing proceeds to step ST11.

Subsequently, in steps ST11 to ST15, the window function determination section 106 determines the degree of coincidence between the frequency of a subcarrier and the frequency of NBN. The NBN determination table NBN_rcv[i] (i=1 to n) is sequentially checked. If the result obtained in step ST12 indicates that NBN is included in both of two neighboring subcarriers, namely, in the i-th subcarrier and in the i+1-th subcarrier, processing proceeds to step ST15. In step ST15, a window function process ON/OFF flag exe_win is set to TRUE, and then the check process terminates. On the contrary, if the result obtained in step ST12 after the check of all subcarriers indicates that NBN is included in neither the i-th subcarrier and nor the i+1-th subcarrier or included in only one of them, processing proceeds to step ST14. In step ST14, the window function process ON/OFF flag exe_win is set to FALSE. This determination result is used by the window function processing section 107.

Next, the window function processing section 107 confirms the window function process ON/OFF flag exe_win determined by the window function determination section 106 and then performs a window function process. If the window function process ON/OFF flag exe_win is FALSE, that is, the window function process is determined to be OFF, the window function processing section 107 proceeds to step ST17, skips the window function process (omits the window function process, that is, does not perform the window function process), and returns to step ST19. If the window function process ON/OFF flag exe_win is TRUE, that is, the window function process is determined to be ON, the window function processing section 107 proceeds to step ST18, performs the window function process, and returns to step ST19. In step ST19, the FFT processing section 108 performs an FFT process to convert the received signal to a frequency-axis signal.

Next, processing proceeds to step ST20. Step ST20 is performed to determine whether a subsequent OFDM symbol exists. If a subsequent OFDM symbol exists, processing returns to step ST01. Steps ST01 to ST20 are then repeated until there are no more subsequent OFDM symbols. If no subsequent OFDM symbol exists, processing returns to step ST21. In step ST21, the data reception process terminates.

The second embodiment, which has been described above, provides advantages described below.

As the NBN detection section 105 and the window function determination section 106 are provided, it is possible to detect the degree of coincidence between the frequency of a subcarrier and the frequency of NBN. Whether the window function process is to be performed is determined in accordance with the degree of coincidence detected by the NBN detection section 105 and the window function determination section 106. More specifically, if a subcarrier frequency coincides with an NBN frequency, the window function process is skipped. If, on the other hand, the subcarrier frequency does not coincide with the NBN frequency, the window function process is performed.

If the subcarrier frequency coincides with the NBN frequency, the frequency-axis signal on which an FFT process is performed by the FFT processing section 108 indicates, as shown in FIG. 3, that no NBN leakage error occurs when the window function process is skipped (the window function process is OFF), and that an NBN leakage error occurs when the window function process is performed (the window function process is ON). If, on the other hand, the subcarrier frequency does not coincide with the NBN frequency, the frequency-axis signal on which the FFT process is performed by the FFT processing section 108 indicates, as shown in FIG. 4, that the NBN leakage error occurs when the window function process is skipped (the window function process is OFF), and that the amount of NBN leakage error decreases when the window function process is performed (the window function process is ON). The BER does not deteriorate when the amount of leakage error is small. Therefore, a better result is obtained if the window function process is skipped when the subcarrier frequency coincides with the NBN frequency and performed when the subcarrier frequency does not coincide with the NBN frequency. If NBN exists in two consecutive subcarriers, the window function process is performed because it can be determined that a leakage error has occurred. If NBN exists in only one subcarrier, the window function process is skipped because it can be determined that no leakage error has occurred. If NBN exists in three or more consecutive subcarriers, the window function process is performed because it can be determined that a leakage error has occurred. If NBN exists in a plurality of subcarriers that are not adjacent to each other, the window function process is skipped because it can be determined that no leakage error has occurred. If NBN does not exist in any subcarrier, the window function process is skipped because it can be determined that no leakage error has occurred. In other words, as the NBN detection section 105 and the window function determination section 106 are provided to detect the degree of coincidence between the frequency of a subcarrier and the frequency of NBN, the deterioration of the BER can be suppressed.

Third Embodiment

Figure 8:
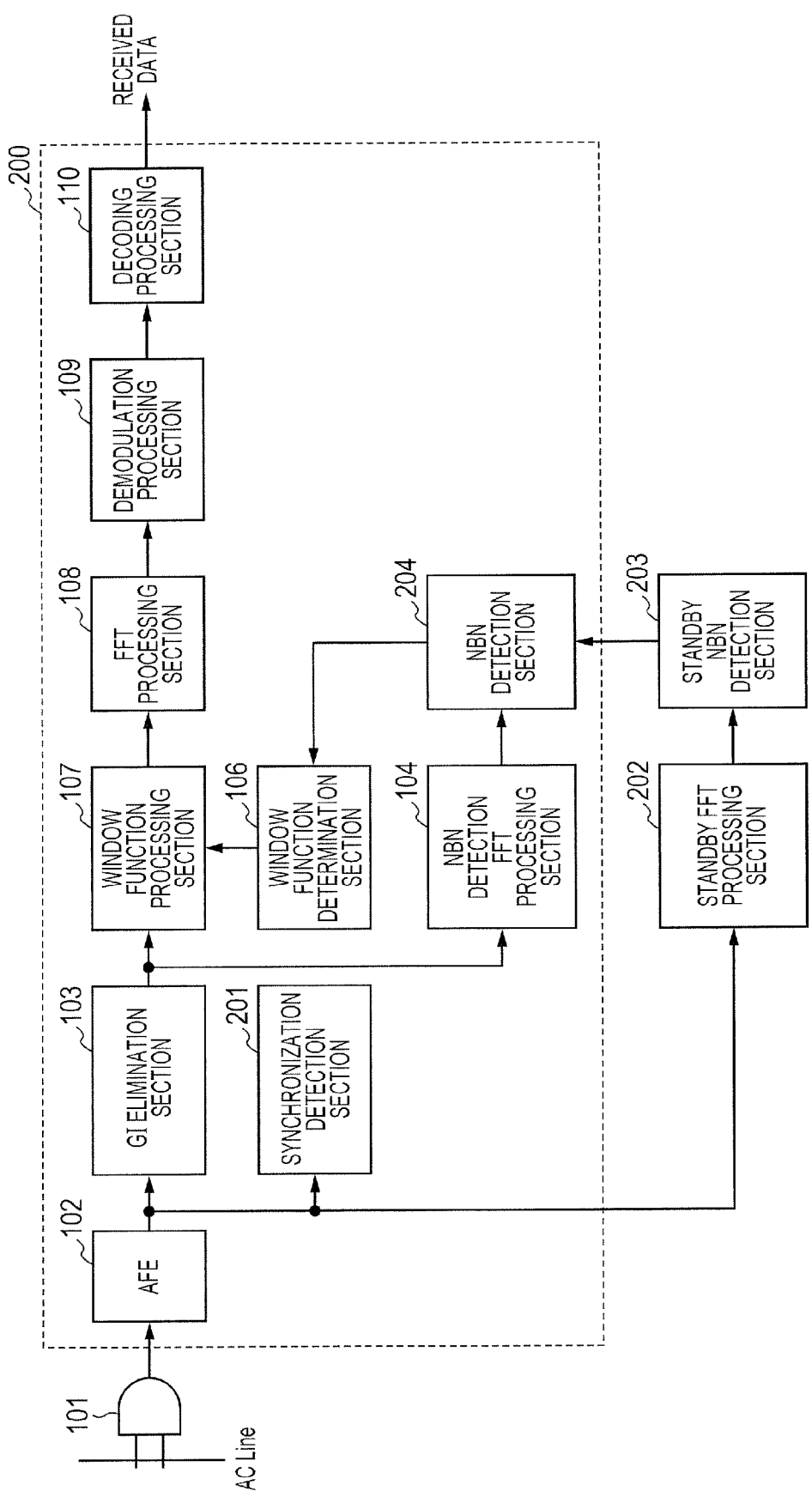
FIG. 8 is a block diagram illustrating an exemplary configuration of the OFDM receiver according to a third embodiment of the present invention.

FIG. 8 is a block diagram illustrating an exemplary configuration of the OFDM receiver according to a third embodiment of the present invention. As is the case with the second embodiment, an OFDM receiver 200 applied to power-line communication (PLC) is shown in FIG. 8 as an embodiment.

As is the case with the OFDM receiver 100 according to the second embodiment, which is shown in FIG. 5, the OFDM receiver 200 is coupled to an AC line through the plug 101 and includes the AFE 102, the GI elimination section 103, the NBN detection FFT processing section 104, the window function determination section 106, the window function processing section 107, the FFT processing section 108, the demodulation processing section 109, and the decoding processing section 110. The OFDM receiver 200 according to the third embodiment further includes a synchronization detection section 201, a standby FFT processing section 202, and a standby NBN detection section 203. An NBN detection section 204 differs from the NBN detection section 105 according to the second embodiment, receives an output from the NBN detection FFT processing section 104 and an output from the standby NBN detection section 203, and delivers its output to the window function determination section 106.

The OFDM receiver 200 according to the third embodiment constantly checks the AC line to determine whether an OFDM signal exists, because it does not know when the OFDM signal is transmitted. Therefore, the OFDM receiver 200 constantly causes the AFE 102 to perform a gain adjustment process, a band-pass filtering process, and an analog-to-digital conversion process on an AC line signal, inputs the resulting processed signal to the synchronization detection section 201, and causes the synchronization detection section 201 to check for an existing OFDM signal. This state is referred to as the standby state. In the standby state, the digital signal derived from analog-to-digital conversion in the AFE 102 is input not only to the synchronization detection section 201 but also to the standby FFT processing section 202. The standby FFT processing section 202 converts the received signal from a time-axis signal to a frequency-axis signal by performing an FFT process on the signal received in the standby state.

The result of the FFT process performed on the signal in the standby state is input the standby NBN detection section 203. The standby NBN detection section 203 performs a threshold-value-based determination process on the electrical power of a subcarrier to determine whether NBN is included in the subcarrier, and stores the result of NBN determination in a standby NBN determination table and the electrical power of the subcarrier in a standby electrical power table. The standby NBN determination table and the standby electrical power table are input to the NBN detection section 204. The NBN detection section 204 uses the standby NBN determination table and the standby electrical power table to check for NBN in the received signal.

If the synchronization detection section 201 determines that an OFDM signal exists, the received signal is not input to the standby FFT processing section 202, but is input to the GI elimination section 103. The received signal is then transmitted from the GI elimination section 103 to the NBN detection FFT processing section 104, to the NBN detection section 204, to the window function determination section 106, to the window function processing section 107, to the FFT processing section 108, to the demodulation processing section 109, and to the decoding processing section 110 in sequence. Eventually, the received data is acquired. The processes performed in the above-mentioned sections are performed in the same manner as described in conjunction with the second embodiment except for the NBN detection section 204.

In the standby state, the NBN detection section 204 receives the standby NBN determination table from the standby NBN detection section 203. While the OFDM signal is being received, the NBN detection section 204 receives an FFT-processed received signal from the FFT processing section 104. As regards a subcarrier that is determined in the standby NBN determination table to include NBN, the NBN detection section 204 performs a threshold-value-based determination process on the electrical power in the standby state, which is stored in the NBN determination table, and on the electrical power of the received signal. If the NBN determination threshold value is exceeded by both the electrical power in the standby state and the electrical power of the received signal, the NBN detection section 204 determines that NBN is included in the subcarrier. The result of the determination is used by the window function determination section 106.

<Operating Steps>

Operating steps performed by the OFDM receiver 200 will now be described.

Figure 9:
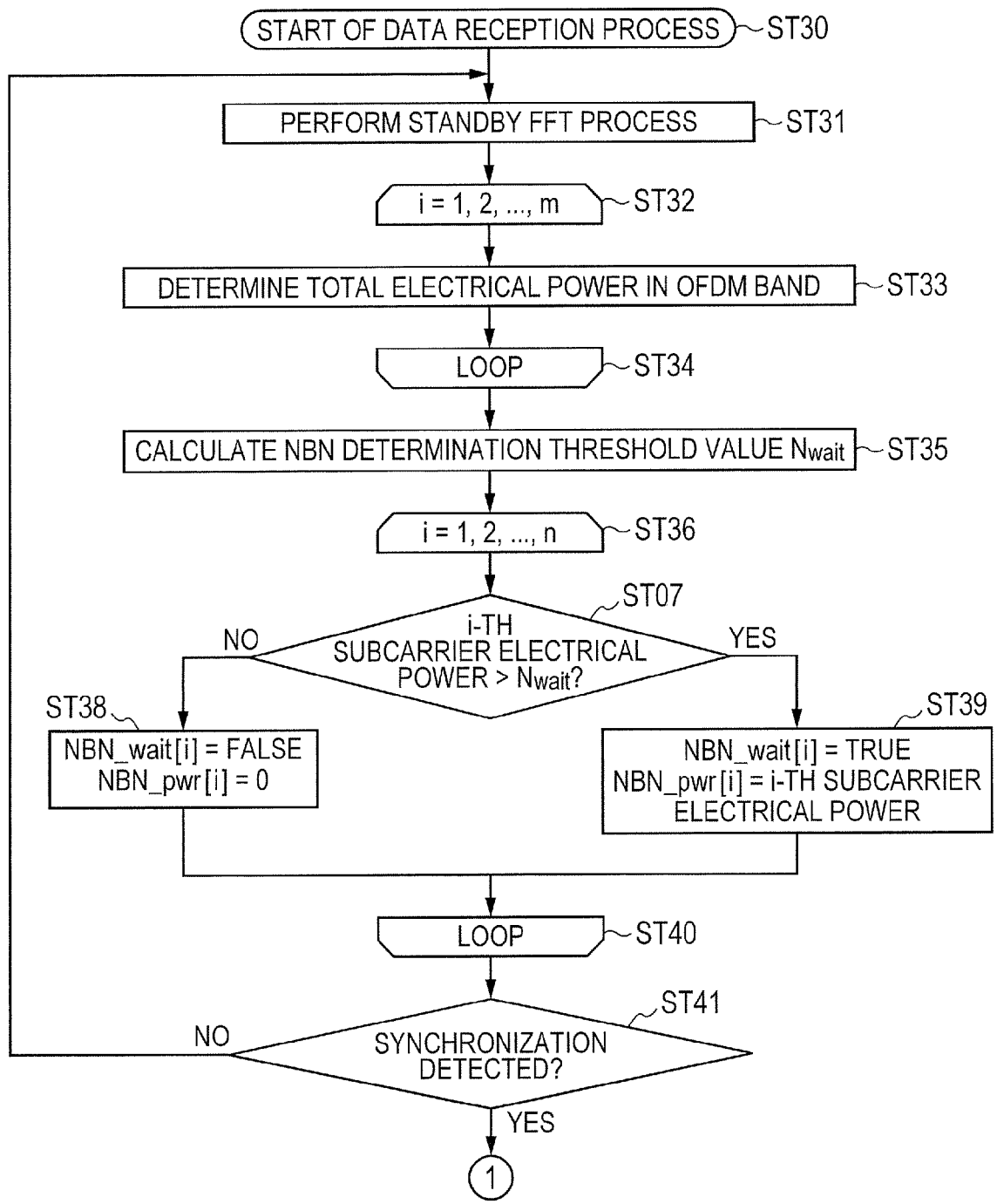
FIG. 9 is a flowchart illustrating the first half of an exemplary operation performed by the OFDM receiver according to the third embodiment.
Figure 10:
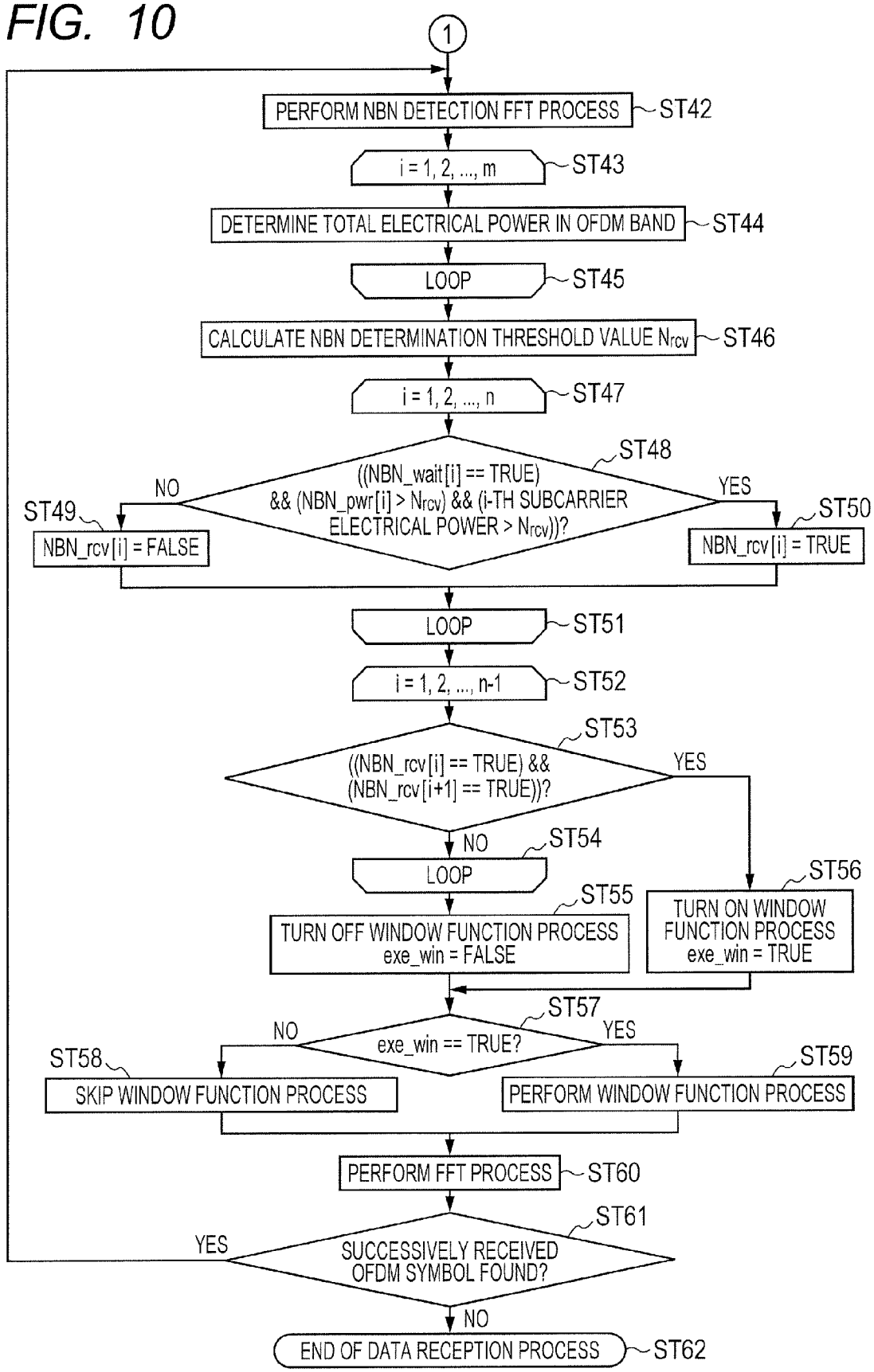
FIG. 10 is a flowchart illustrating the second half of the exemplary operation performed by the OFDM receiver according to the third embodiment.

FIGS. 9 and 10 are flowcharts illustrating an exemplary operation performed by the OFDM receiver 200 according to the third embodiment. FIG. 9 shows the first half of the exemplary operation, and FIG. 10 shows its second half.

In step ST30, the OFDM receiver 200 starts a data reception process. In step ST31, the standby FFT processing section 202 performs an FFT process to convert a received signal to a frequency-axis signal. Processing then proceeds to step ST32.

Next, in a loop between step ST32 and step ST34, the standby NBN detection section 203 determines the total electrical power of subcarriers in an OFDM band. The integer m in step ST33 is the number of subcarriers in the OFDM band. In the next step, which is step ST35, in accordance with the total electrical power of the subcarriers in the OFDM band, the standby NBN detection section 203 determines a standby state NBN determination threshold value $N_{wait}$, which is used to determine whether NBN is included in the OFDM band.

Figure 11:
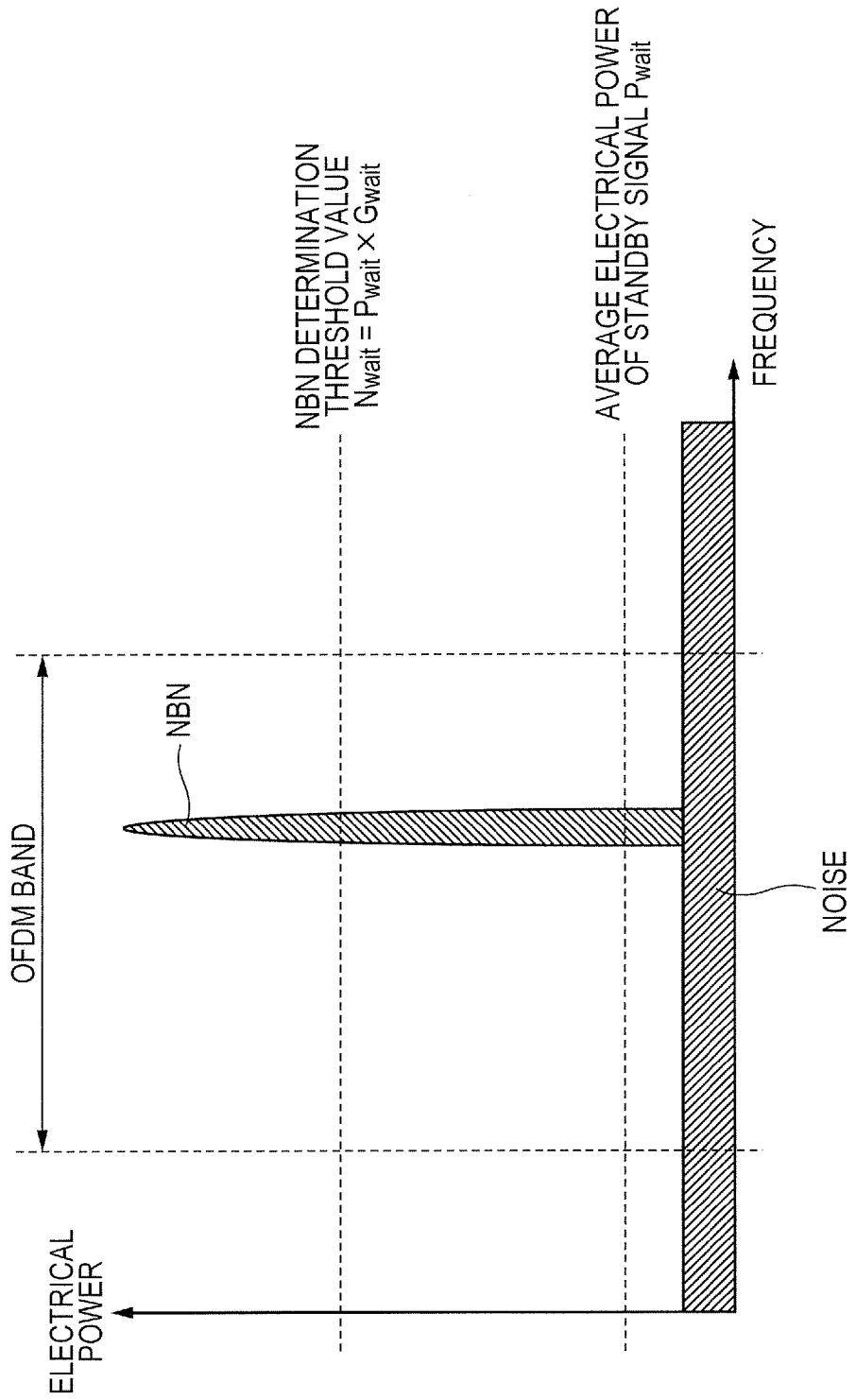
FIG. 11 is an explanatory diagram outlining an NBN determination method employed in a standby state.

FIG. 11 is an explanatory diagram outlining an NBN determination method employed in the standby state. As is the case with the explanatory diagram of FIG. 7, the horizontal axis indicates frequency, and the vertical axis indicates electrical power. FIG. 11 shows a situation where there is overall background noise (marked "NOISE"), which looks like, for example, white noise, and NBN is included in the OFDM band although subcarriers are not received. As shown in FIG. 11, the average electrical power $P_{wait}$ of the received signal in the OFDM band is lower than the average electrical power $P_{rcv}$ shown in FIG. 7 because an OFDM modulated signal is not received. However, as is the case with the method of calculating the NBN determination threshold value $N_{rcv}$ when the OFDM modulated signal is received, which is described with reference to FIG. 7, the standby state NBN determination threshold value $N_{wait}$ is determined by the following equation:

Standby state NBN determination threshold value
$N_{wait} = P_{wait} \times G_{wait}$ where $P_{wait}$ is the average electrical power in the OFDM band and determined by dividing the total electrical power in the OFDM band by the number of subcarriers m. $G_{wait}$ is a gain for determining the standby state NBN determination threshold value $N_{wait}$.

Returning to the flowchart of FIG. 9, in a loop between step ST36 and step ST40, the standby NBN detection section 203 determines whether NBN exists with respect to each subcarrier in the OFDM band. The integer n in step ST36 coincides with the number of subcarriers. In step ST37, the standby state NBN determination threshold value $N_{wait}$ determined in step ST35 as shown in FIG. 11 is used to perform a threshold-value-based determination process on the standby state received signal electrical power of the i-th subcarrier frequency in order to determine whether NBN is included in the i-th subcarrier frequency. If the electrical power of the i-th subcarrier frequency is not higher than the standby state NBN determination threshold value $N_{wait}$, it is determined that no NBN is included in the i-th subcarrier frequency, and then processing proceeds to step ST38. In step ST38, FALSE is set in a standby NBN determination table NBN_wait[i], and the prevailing electrical power is considered to be 0 (zero) and set in a standby electrical power table NBN_pwr[i]. If, on the contrary, the electrical power of the i-th subcarrier frequency is higher than the standby state NBN determination threshold value $N_{wait}$, it is determined that NBN is included in the i-th subcarrier frequency, and then processing proceeds to step ST39. In step ST39, TRUE is set in the standby NBN determination table NBN_wait[i], and the prevailing electrical power is set in the standby electrical power table NBN_pwr[i]. After the above process is repeated for n subcarriers, processing proceeds to step ST41.

Next, in step S41, the synchronization detection section 201 determines whether an OFDM synchronization signal is detected. If synchronization is not detected, process returns to step ST31, and steps ST31 to ST41 are repeated until synchronization is detected. If synchronization is detected, processing proceeds to step ST42, which is shown in FIG. 10. In step ST42, the OFDM signal is demodulated.

Steps ST42 to ST62 are the same as the corresponding steps in the second embodiment except for step ST48.

Step ST48 corresponds to step ST07 in the second embodiment and is performed by the NBN detection section 204 to determine whether NBN is included in the i-th subcarrier. However, step ST48 differs from step ST07 in determination conditions. In step ST07, only a threshold-value-based determination process is performed on the electrical power of the i-th subcarrier. In step ST48, on the other hand, the standby NBN determination table NBN_wait[i] and the standby electrical power table NBN_pwr[i] are checked in addition to the execution of the threshold-value-based determination process. If all the conditions described below are met, processing proceeds to step ST50. In step ST50, TRUE is set in the NBN determination table NBN_rcv[i]. The conditions to be met are: the electrical power of the i-th subcarrier is higher than the NBN determination threshold value $N_{rcv}$; the standby NBN determination table NBN_wait[i] has determined that NBN is included in the i-th subcarrier frequency in the standby state; and the standby electrical power table NBN_pwr[i] indicates that the electrical power at the i-th subcarrier frequency in the standby state is higher than the NBN determination threshold value $N_{rcv}$. If all the above-described conditions are not met, processing proceeds to step ST49. In step ST49, FALSE is set in the NBN determination table NBN_rcv[i]. After the above process is repeated for n subcarriers, processing proceeds to step ST52. In step ST52, the window function determination section 106 determines the degree of coincidence between the frequency of a subcarrier and the frequency of NBN, as is the case with the second embodiment. The subsequent operating steps will not be described here because they are the same as the corresponding operating steps in the second embodiment, which are described with reference to FIG. 6.

The third embodiment, which has been described above, provides advantages described below.

In a situation where the OFDM receiver 200 is coupled to an AC line (transmission path) having frequency characteristics, it is possible to prevent the NBN detection section 204 from erroneously determining that NBN is included although it is not actually included. This is accomplished by causing the NBN detection section 204 to check for NBN, performing a threshold-value-based determination process on the electrical power of the i-th subcarrier, using the standby NBN determination table NBN_wait[i] to determine whether NBN is included in i-th subcarrier frequency in the standby state, and using the standby electrical power table NBN_pwr[i] to perform a threshold-value-based determination process on the i-th subcarrier in the standby state. This makes it possible to prevent the BER from deteriorating in the OFDM receiver 200 coupled to an AC line (transmission path) having frequency characteristics.

FIG. 12 is an explanatory diagram illustrating an OFDM signal received from a transmission path having frequency characteristics. As is the case with the explanatory diagram of FIG. 7, the horizontal axis indicates frequency, and the vertical axis indicates electrical power. In FIG. 12, the frequency characteristics of an AC line (transmission path) are schematically indicated by a broken-line curve. In contrast to the subcarriers shown in FIG. 7, a plurality of subcarriers in the OFDM band, which are shown in FIG. 12, are frequency-dependent due to the influence of the frequency characteristics of the transmission path. Let us assume that an OFDM signal is received through a transmission path having frequency characteristics shown in FIG. 12. The NBN detection section 105 merely performs a threshold-value-based determination process on the electrical power of the i-th subcarrier to determine whether NBN is included. However, when an OFDM signal is received through a transmission path having frequency characteristics shown in FIG. 12, an insignificantly attenuated portion shown at 300 exceeds the NBN determination threshold value $N_{rcv}$ so that an original OFDM signal is erroneously recognized as NBN. Meanwhile, the OFDM receiver 200 according to the third embodiment receives only noise other than NBN in the standby state. Therefore, the standby NBN detection section 203 can determine that there is no NBN. As such being the case, when an OFDM signal is received, the standby NBN determination table NBN_wait[i], which stores the result of NBN determination in the standby state, and the standby electrical power table NBN_pwr[i], which stores the electrical power prevailing in the standby state, are also used for determination purposes in addition to performing a threshold-value-based determination process on the electrical power of the i-th subcarrier. As a result, even when an OFDM signal is received through a transmission path having frequency characteristics shown in FIG. 12, it is possible to prevent the OFDM signal from being erroneously recognized as NBN.

While the embodiments of the present invention contemplated by the inventors have been described in detail, the present invention is not limited to the specific embodiments described above. It is to be understood that variations and modifications of the present invention may be made without departing from the spirit and scope of the present invention.

For example, although the OFDM receivers 100, 200 applicable to power-line communication (PLC) have been described in the second and third embodiments, respectively, the present invention is also applicable to an OFDM receiver that is applied to other communication media or broadcast media. Such application is accomplished when the input section 150 exemplified for the AFE 102 and the GI elimination section 103 is changed to comply with a relevant protocol. Further, the functions described in conjunction with the second and third embodiments may be implemented by hardware or by software provided as a program to be executed in a signal processing device having the processor shown in FIG. 2.

What is claimed is:

1. A signal processing device that outputs received data upon receipt of a modulated signal that is orthogonal frequency division modulated by a plurality of subcarriers, the signal processing device comprising:
   a processor; and
   a memory storing instructions which cause the processor to execute:
      an input section that extracts a predetermined number of input data from the modulated signal that is in a time series;
      a window function processing section that exercises control to determine whether or not to perform a window function process on the predetermined number of input data;
      an FFT processing section that performs an FFT process on data output from the window function processing section; and
      a narrow-band noise detection/determination section that detects a degree of coincidence between a frequency of narrow-band noise included in the modulated signal and a plurality of frequencies of the subcarriers, and exercises control to determine in accordance with the detected degree of coincidence whether the window function processing section should perform the window function process on the input data and supply the resulting processed data to the FFT processing section or supply the input data to the FFT processing section without performing the window function process on the input data.

2. The signal processing device according to claim 1, wherein the FFT processing section acts as a first FFT processing section, wherein the narrow-band noise detection/determination section includes a second FFT processing section that performs an FFT process on the input data to calculate electrical power at the frequency of each of the subcarriers, wherein, when a threshold value is exceeded by the electrical power at two neighboring subcarrier frequencies, the narrow-band noise detection/determination section allows the window function processing section to perform the window function process, and wherein, when the threshold value is exceeded by the electrical power at only one subcarrier frequency, the narrow-band noise detection/determination section inhibits the window function processing section from performing the window function process.

3. The signal processing device according to claim 2, wherein the narrow-band noise detection/determination section calculates an average value of electrical power at all subcarrier frequencies within the band of the modulated signal from the electrical power calculated by the second FFT processing section, and prescribes the threshold value in accordance with the average value.

4. The signal processing device according to claim 1, wherein the FFT processing section acts as first FFT processing section, wherein the signal processing device further includes a standby FFT processing section, wherein the narrow-band noise detection/determination section includes a second FFT processing section, wherein, while the modulated signal is being input, the second FFT processing section performs an FFT process on the input data to calculate reception state electrical power at the frequency of each of the subcarriers, wherein, while the modulated signal is not being input, the standby FFT processing section performs an FFT process on standby state input data, which corresponds to the input data, to calculate standby state electrical power at the frequency of each of the subcarriers, and wherein, in accordance with the reception state electrical power and with the standby state electrical power, the narrow-band noise detection/determination section exercises control to determine whether the window function processing section should perform the window function process on the input data and supply the resulting processed data to the first FFT processing section or supply the input data to the first FFT processing section without performing the window function process on the input data.

5. The signal processing device according to claim 4, wherein, when a standby state threshold value is exceeded by the standby state electrical power at only one subcarrier frequency and a predetermined reception state threshold value is exceeded by the reception state electrical power at the only one subcarrier frequency, the narrow-band noise detection/determination section inhibits the window function processing section from performing the window function process.

6. The signal processing device according to claim 1, wherein the memory further stores instructions which cause the processor to execute:
a demodulation processing section that performs a demodulation process on data output from the FFT processing section; and
a decoding processing section that performs a decoding process on data output from the demodulation processing section and outputs the received data,
wherein the input section includes an analog front-end section coupled through a plug to a transmission path for power-line communication, and a guard interval elimination section that receives an output from the analog front-end section and performs predetermined preprocessing to extract the predetermined number of input data.

7. The signal processing device according to claim 6, wherein the processor and memory are formed over a single semiconductor substrate.

8. The signal processing device according to claim 6, wherein the processor and memory are divided into plural parts that are formed over multi-chip semiconductor integrated circuits and incorporated into a single package.

9. A signal processing method that outputs received data upon receipt of a modulated signal that is orthogonal frequency division modulated by a plurality of subcarriers, the signal processing method comprising the steps of:
detecting a degree of coincidence between a frequency of narrow-band noise included in the modulated signal and a plurality of frequencies of the subcarriers; and
determining in accordance with the detected degree of coincidence whether to perform a window function process on a predetermined number of input data extracted from the modulated signal that is in a time series and then perform an FFT process, or to perform the FFT process on the input data without performing the window function process.

10. The signal processing method according to claim 9, further comprising the steps of:
performing the FFT process as a first FFT process;
performing a second FFT process in which an FFT process is performed on the input data to calculate electrical power at the frequency of each of the subcarriers;
when a threshold value is exceeded by the electrical power at two neighboring subcarrier frequencies, performing the first FFT process after the window function process; and
when the threshold value is exceeded by the electrical power at only one subcarrier frequency, performing the first FFT process without performing the window function process.

11. The signal processing method according to claim 10, further comprising the steps of:
calculating an average value of electrical power at all subcarrier frequencies within the band of the modulated signal from the electrical power calculated in the second FFT process; and
prescribing the threshold value in accordance with the average value.

12. The signal processing method according to claim 9, further comprising the steps of:
performing the FFT process as a first FFT process;
while the modulated signal is being input, performing a second FFT process on the input data to calculate reception state electrical power at the frequency of each of the subcarriers;
while the modulated signal is not being input, performing a third FFT process on standby state input data, which corresponds to the input data, to calculate standby state electrical power at the frequency of each of the subcarriers; and
in accordance with the reception state electrical power and with the standby state electrical power, determining whether to perform the window function process on the input data and then perform the first FFT process or to perform the first FFT process without performing the window function process.

13. The signal processing method according to claim 12, further comprising the step of:
when standby state threshold value is exceeded by the standby state electrical power at only one subcarrier frequency and a predetermined reception state threshold value is exceeded by the reception state electrical power at the only one subcarrier frequency, performing the first FFT process on the input data without performing the window function process.

14. A non-transitory, computer readable storage medium storing a program that, when executed by a signal processing device having a processor, a memory, and an input section, causes the signal processing device to perform a function for generating received data from a modulated signal that is input from the input section and orthogonal frequency division modulated by a plurality of subcarriers, the function comprising:
a step of performing a window function process on a predetermined number of input data extracted from the modulated signal that is in a time series;
a step of detecting/determining narrow-band noise, which detects a degree of coincidence between a frequency of narrow-band noise included in the modulated signal and a plurality of frequencies of the subcarriers;
a step of making a window function determination, which determines, in accordance with the degree of coincidence detected in the step of detecting/determining narrow-band noise, whether to perform the window function process in the step of performing a window function process or to skip the window function process; and
a step of performing an FFT process, which performs an FFT process on an output from the step of performing a window function process.

15. The non-transitory, computer readable storage medium according to claim 14,
wherein the step of performing an FFT process is performed as a step of performing a first FFT process,
wherein the step of detecting/determining narrow-band noise includes a step of performing a second FFT process in which an FFT process is performed on the input data to calculate electrical power at the frequency of each of the subcarriers, wherein, when a threshold value is exceeded by the electrical power at two neighboring subcarrier frequencies, the window function process is performed in the step of performing a window function process, wherein, when the threshold value is exceeded by the electrical power at only one subcarrier frequency, the step of performing a window function process skips the window function process.

16. The non-transitory, computer readable storage medium according to claim 15,
wherein the step of detecting/determining narrow-band noise calculates an average value of electrical power at all subcarrier frequencies within the band of the modulated signal from the electrical power calculated in the step of performing a second FFT process, and prescribes the threshold value in accordance with the average value.

17. The non-transitory, computer readable storage medium according to claim 14,
wherein the step of performing an FFT process is performed as a step of performing a first FFT process,
wherein the function further includes a step of performing a standby FFT process,
wherein the step of detecting/determining narrow-band noise includes a step of performing a second FFT process,
wherein, while the modulated signal is being input, the step of performing a second FFT process performs an FFT process on the input data to calculate reception state electrical power at the frequency of each of the subcarriers,
wherein, while the modulated signal is not being input, the step of performing a standby FFT process performs an FFT process on standby state input data, which corresponds to the input data, to calculate standby state electrical power at the frequency of each of the subcarriers, and
wherein, in accordance with the reception state electrical power and with the standby state electrical power, the step of detecting/determining narrow-band noise exercises control to determine whether to perform the window function process on the input data in the step of performing a window function process and then forward the resulting processed data to the step of performing a first FFT process or to skip the window function process and then forward the input data to the step of performing a first FFT process.

18. The non-transitory, computer readable storage medium according to claim 17,
wherein, when a standby state threshold value is exceeded by the standby state electrical power at only one subcarrier frequency and a predetermined reception state threshold value is exceeded by the reception state electrical power at the only one subcarrier frequency, the step of detecting/determining narrow-band noise causes the step of performing a window function process to skip the window function process.

* * * * *